Inventors
Clifton A. Cobb
James T. Williams

Attys.

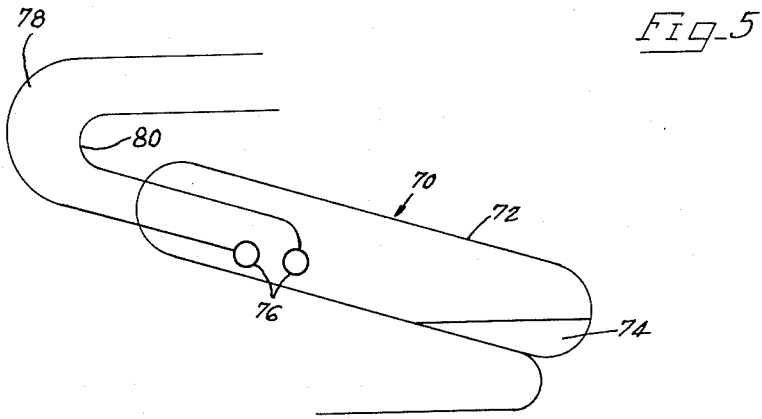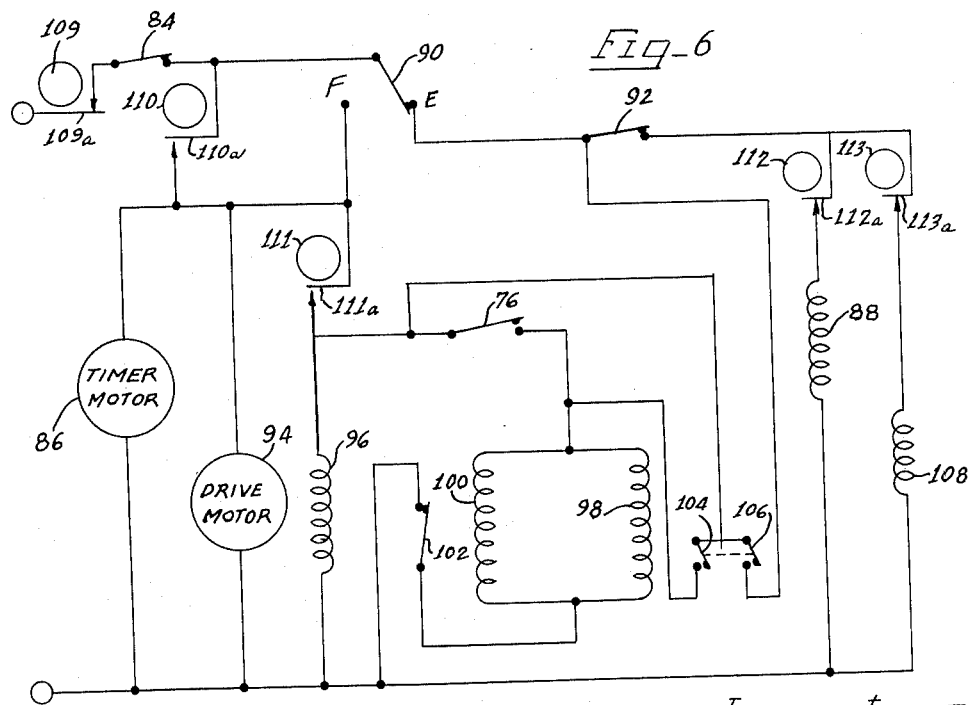

United States Patent Office 3,093,841
Patented June 18, 1963

3,093,841
METHOD OF DETERMINING THE LIQUID LEVEL IN A CLOTHES WASHING MACHINE
Clifton A. Cobb and James T. Williams, St. Joseph, Mich., assignors to Whirlpool Corporation, St. Joseph, Mich., a corporation of Delaware
Original application Aug. 22, 1960, Ser. No. 51,226, now Patent No. 3,065,618, dated Nov. 27, 1962. Divided and this application Jan. 18, 1962, Ser. No. 167,109
3 Claims. (Cl. 8—158)

This invention relates to laundry apparatus and particularly to automatic water level control means therefor capable of determining and maintaining the laundry liquid-to-wash load ratio at an optimum value by utilizing a torque signal generated in the machine by the agitator.

This application is a division of the copending Clifton A. Cobb and James T. Williams application filed August 22, 1960, under Serial No. 51,226, now Patent No. 3,065,618.

Currently, automatic washing machines essentially utilize any one of three available methods for controlling the water in the tank or tub thereof. These methods are, first, filling the tub to a maximum level by means of a maximum water level control switch; second, selectively filling the tub to any of, for example, three levels by means of a three position water level switch, and third, selectively filling the tub to any level between a maximum and minimum by means of an "infinite" control water level switch. The first method is objectionable in that there is no variation possible in the level, regardless of load size. The second and third methods are objectionable in that they are dependent upon the judgment of the operator, and if a decision is made which is inappropriate for a given load, the choice can only be modified by a further decision involving an increase of the amount of water in the tub, which may also be unsuitable.

The present invention eliminates these difficulties by automatically introducing an amount of water into the tub which is optimum for the requirements of a specific load. This result is achieved by employing the principle of a torque signal. For example, when a given load is supplied with an insufficient amount of water, torque from the agitator will be transmitted through the load to the basket and the tank. As the agitator oscillates, therefore, the torque transmitted through the load to the basket and tank produces corresponding movement of the basket and tank which can be sensed and used as a signal. When an additional increment of water has been added to the tank or tub which is sufficient for the load, the desired transmission of torque is reduced to a somewhat smaller value. This happens since there is enough water present in the basket with the load whereby the torque of the oscillating agitator cannot be transmitted to the basket and tank. This, of course, is logical since it is well known that water will not support shear forces. Thus, although the amount of torque produced by the load when no water is present is quite substantial, when the load is properly immersed the torque is reduced to an insignificant level. Accordingly, a torque signal can be utilized to afford a highly accurate control of the amount of water in the tank regardless of the load size or of the types of fabric included in the load make-up.

Desirably, the washer of the invention also incorporates a minimum and maximum water level switch. Pneumatic or electrical means may be utilized for the torque signal pick-up, but a mercury sensor switch has been found highly effective for this purpose, and this switch is utilized in conjunction with the minimum and maximum water level switch. The minimum water level switch assures that a load will not be agitated within the basket when there is an entire absence of water in the tub, and thus serves as a safety device. Similarly, the maximum water level switch limits the amount of water to a predetermined safe level so that extra heavy loads will not introduce more water in the machine than it can hold.

Circuit hold relay and time delay relay means are used with the mercury sensor switch so that successive small increments of water are introduced into the basket until such time as the agitation or torque transmitted to the tub is below the critical level, thus indicating that the optimum amount of water is present for the load.

Accordingly, it is an object of the present invention to provide a washing machine having an automatic water level control which provides the correct amount of water for a given load regardless of the types of fabric used or of the load size.

Another object of the invention is to provide an automatic washer which saves hot water by eliminating filling of the tub beyond the amount necessary, with consequent savings in water and fuel.

Another object of the invention is to provide a device as indicated which affords a substantial saving in the amount of detergent used, inasmuch as the detergent used is proportionate to the water use.

Yet another object of the invention is to provide a washer which is unusually long-lasting, since the torque transmitted from the agitator to the basket, and the ensuing stresses and strains are eliminated in the operation of the machine.

Other objects and advantages of the invention will become apparent as the description proceeds in accordance with the drawings in which:

On the drawings:

FIGURE 5 is a diagrammatic showing of mercury sensor switch means for use in controlling the water level in a washing machine; and FIGURE 6 is a circuit diagram of means cooperating with the sensing means shown in FIGURE 5.

As shown on the drawings:

Figure 1:
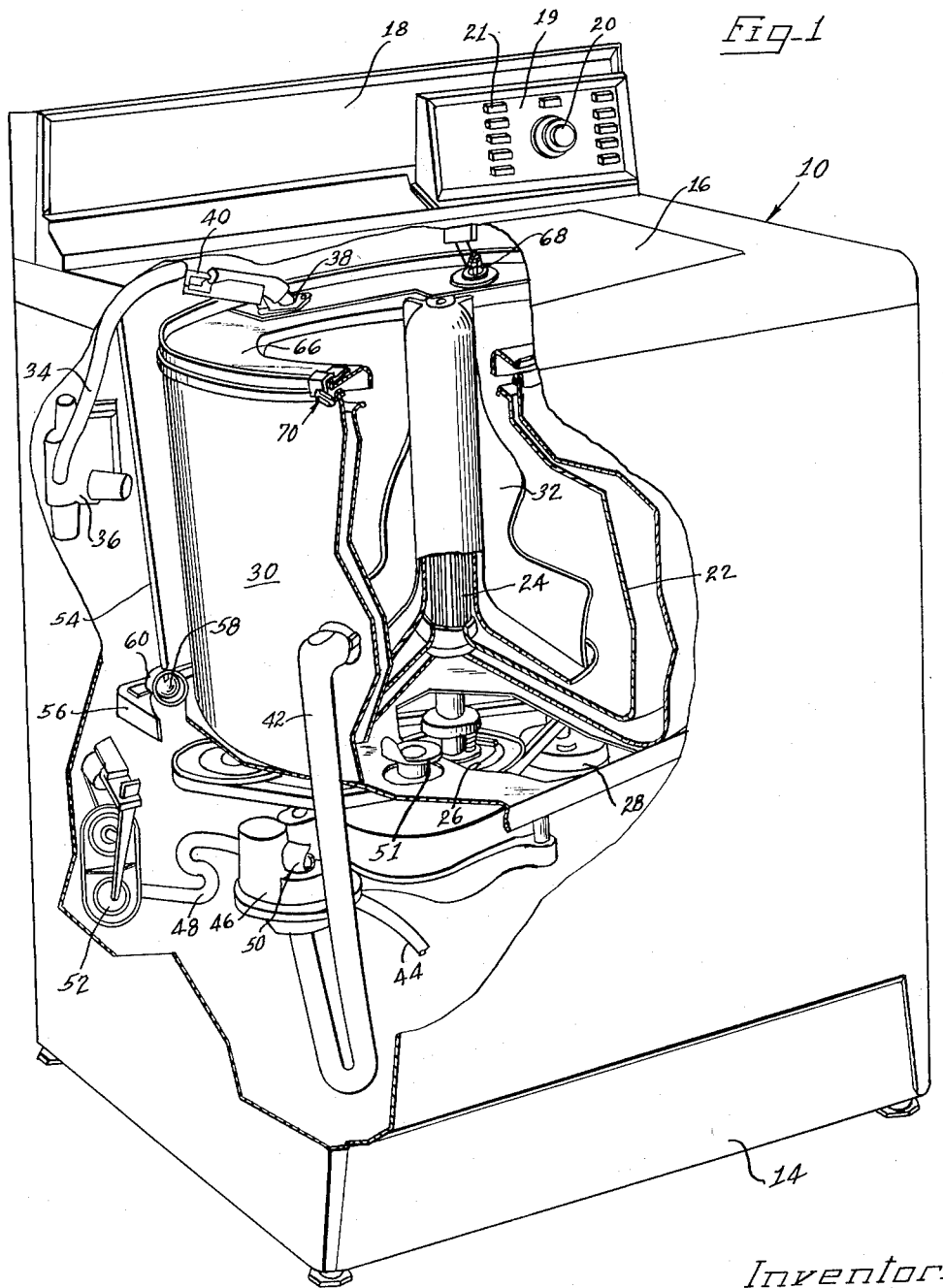
FIGURE 1 is a perspective view of a washing machine with which the water level control of the invention may be advantageously utilized, and which is broken away to afford a view of the operating parts thereof.
Figure 2:
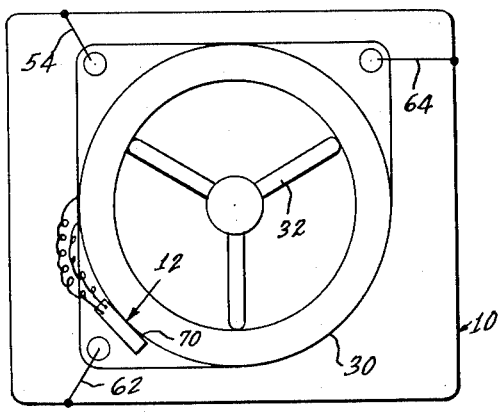
FIGURE 2 is a top plan view in schematic form of a washing machine, such as shown in FIGURE 1, and liquid level control means therefor.

Although the invention is applicable to various types of washers incorporating different types of agitators, the exemplary machine disclosed herein is of the vertical axis type utilizing an oscillatory agitator. Referring to the drawings, a washing machine 10 is shown in FIGURE 1, and in schematic form in FIGURES 2 and 3, wherein the water level may be automatically controlled by water level control means 12, as shown in FIGURE 2. As seen more particularly with respect to FIGURE 1, the washing machine 10 may include a cabinet 14 with a lid 16, and a back 18 including a control panel 19 having presettable sequential control means 20 for operating the machine automatically through a programmed schedule of washing, rinsing and extracting periods. Selector type switches operated by push buttons 21 condition the circuitry associated with the control means 20 for special operating cycles as desired by the operator, for example, in selecting water temperature, delicate goods cycles, etc.

A foraminous basket 22 is mounted on a spin tube 24 for actuation by drive and brake mechanism 26 energized by a motor 28. The basket 22 is mounted in an outer tub or tank 30 and clothes are agitated by an agitator 32 in the basket as also understood by those skilled in the art.

A water entry hose 34 communicates with a mixing valve 36 and a water inlet 38 for introducing water into the basket, and an air gap vacuum break 40 may be provided. Recirculating hoses 42 and 44 are connected to a uni-directional drain and recirculating pump 46, drain and suds return hoses 48 and 50 being connected with the pump 46 and with an automatic two-way valve 52. Hose 50 connects with the drain outlet 51 from the tank or tub 30.

Figure 3:
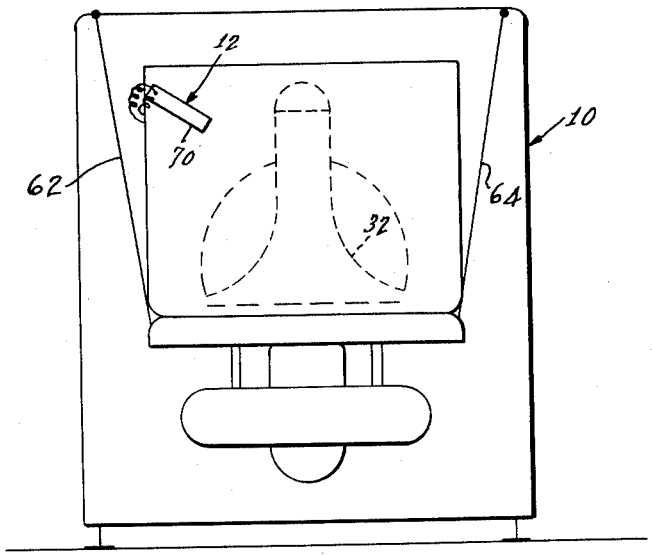
FIGURE 3 is a vertical elevation view, also in schematic form, of the structure shown in FIGURE 2.

In the form shown in FIGURES 1 through 3, the tub 30 is mounted by means of a three-point ball and rod suspension system, a rod 54 being shown in FIGURE 1 as pivotally connected to a base plate 56 for the tub by ball means 58 in a socket 60. Other rods 62 and 64 are illustrated diagrammatically in FIGURES 2 and 3, the upper ends of the rods 56, 62 and 64 being pivotally connected to the top of the cabinet 14.

The tub 30 is formed with a rim 66 extending radially inwardly and downwardly over the basket 22, and in a preferred form of the invention, a snubber 68 is attached to the cabinet 14 and presses down on the rim or tub ring 66 to damp the oscillations produced during operation of the machine as hereinafter described. Where such a snubber is utilized, the suspended operating system will tend to rotate about a pivot point afforded by the snubber 68 as a result of the torque transmitted from the agitator 32 to the suspended system since the snubber represents the only semi-stationary point of the suspended system. Pneumatic or electrical sensing means may be positioned on the tub or any location receiving the torque described, and in the form shown, the invention provides for placing a mercury sensor switch 70, as seen in FIGURES 1, 2, 3 and 4, for the level control means 12, at a point which is substantially the farthest distance away from this stationary pivoting point. Thereby, the amplitude of the sensed signal is increased. Location of sensor switch 70 in positions closer to the snubber 68 will result in reduced torque signals.

It will be understood, however, that the method of automatic water level control of the invention will be entirely effective even though a snubber is not utilized in the machine, since the suspended system would still oscillate from the suspension rods 54, 62 and 64 because of the transmission of torque from the agitator through the load to the basket and tank.

Thus in the embodiment of FIGURES 1 through 3, the mercury sensor 70 may be disposed substantially diametrically opposite the pivot point afforded by the snubber 68, so that the signal will be maximized, and as seen in FIGURE 5, the means 70 may include a mercury tube 72 which may be secured such as to tub 30 at an adjustable angle so that the mercury 74 will contact switch contact means 76 upon oscillation of agitator 32 when there is not enough water present in tub 30. Switch contacts 76 are provided with electrical leads 78 and 80 so as to incorporate switch 76 into a control circuit such as shown in FIGURE 6.

Although FIGURE 5 shows a mercury switch to be used as the torque sensor, it should be understood that other torque sensors such as pneumatic or hydraulic could be used. It is also important to realize that the location of these sensors on the laundry machine is not critical as long as they are capable of sensing the torque that is transmitted through the clothes load from the agitator when the clothes load is not immersed in the proper amount of water. Once this torque is sensed, the sensors must be able to initiate means to add water to the clothes load until the torque becomes somewhat smaller.

Figure 4:
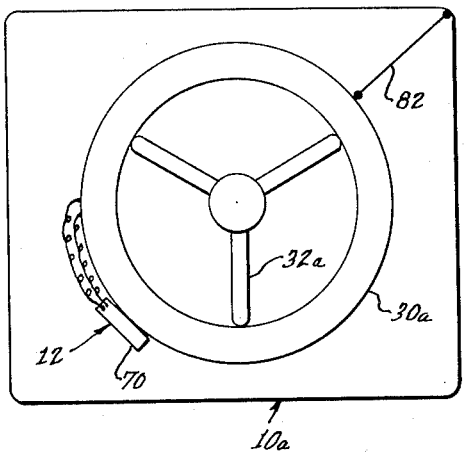
FIGURE 4 is a top plan view in schematic form of the water level control means of the invention in combination with a different type of washing machine.

As seen in FIGURE 4, the signal actuating means 12a may be mounted on a machine 10a of the pedestal type, so that the tub 30a is supported on a pedestal (not shown) which extends upwardly from the base of the machine. If desired an anti-rotating bar 82 may be pivotally connected between the cabinet and the tub, and as shown, the device 12a and the mercury switch 70 thereof is mounted diametrically opposite the bar 82 so that signal forces afforded by the torque from the oscillation of the agitator 32a will be maximized from the pivot point afforded by the said bar.

Referring to FIGURE 6 there is shown a circuit diagram incorporating the subject water level control. Included in this circuit is a timer motor 86 which drives timer motor operated cams 109, 110, 111, 112 and 113 to operate their corresponding switches 109a, 110a, 111a, 112a and 113a to operate a washing machine such as shown in FIGURE 1 through a cycle of operation. The positioning of the timer cams is controlled by presettable sequential control means 20. Other elements controlling the operating functions of the washing machine through a cycle of operation are the main drive motor 94, the agitation control solenoid 96, water inlet valve 88 and the spin control solenoid 108.

As shown in FIGURE 6, the switch 76 of mercury sensor 70 is shown as normally open in the circuit diagram schematically represented, and will close when the agitator transmits torque through the load to the basket and tank to the extent that the short jerky oscillations of the basket and tank assembly force the mercury 74 in the mercury sensor switch 70 to momentarily close this switch 76. The automatic washer is started by advancing the timer or presettable sequential control means 20 into its first time unit of operation, which closes switch 109a, and closing the push-pull line switch 84 associated with the control means 20. At this time, the water inlet solenoid 88 associated with mixing valve 36 will be energized through a minimum water level switch 90 in its empty position shown at E, and through a normally closed maximum water level switch 92. Thus water will be introduced into the machine through the water inlet 38 until the minimum water level switch 90 switches from its empty to its full position shown at F. Thereupon, the timer motor 86 and the machine motor 94 are energized through the full position of the minimum water level switch independent of cam operated switch 110a. The agitation solenoid 96 is also energized at the said full position of the minimum water level switch 90 through its cam operated switch 111a so that the agitator 32 will start to oscillate, and the washing process will begin.

If at this time there is sufficient water in the basket for the load being washed, i.e., so that the load is immersed to a sufficient extent to reduce torque to a desirable minimum, the machine will proceed through the rest of the cycle without further water being introduced into the tub.

However, the usual load will require more water in that with only a minimum amount of water the agitator will transmit torque through the load to the basket and tank or tub, thereby closing the mercury switch 76 as described. This closing of the switch 76 of mercury sensor switch 70 will be an impulse only long enough so that both the circuit hold relay 98 and the time delay relay 100 in parallel therewith will be energized through the normally closed contacts 102 connected with the time delay relay 100. When the circuit hold relay 98 is thus energized, the normally open contacts 104 and 106 connected therewith will close, thereby energizing the circuit hold relay 98 and time delay relay 100 through contact 104 to provide a holding circuit.

At the same time, the water inlet solenoid 88 will be energized through relay contact 106, the maximum water level switch 92 and cam operated switch 112a to introduce a further increment of water into the machine, in accordance with the need therefor indicated by the energization of the mercury switch 76.

The time delay relay 100 desirably is constructed to permit water to enter the machine for a predetermined small interval so that a quite accurate determination of the optimum water level in the machine is afforded. For example, the time delay relay may be of the "dash pot" type, so that, e.g., a period of five seconds may elapse before the normally closed contacts 102 open. Opening of these contacts thus de-energizes both the time delay relay 100 and the circuit hold relay 98 to effect de-energization of the solenoid 88.

If an insufficient amount of water is added by the increment thus afforded, the torque reaction produced through the load and basket to the tub will again energize the mercury switch 76 temporarily so that the described cycle is repeated.

As hereinabove stated, the signal afforded by the switch 76 of mercury sensor switch 70, particularly in its position diametrically opposite the pivot point afforded by the snubber 68, is highly sensitive, so that this procedure may be repeated until the optimum point is quite accurately located. The sensitivity of the system can be further controlled by adjusting the angle of the longitudinal axis of the mercury sensor switch 70 with respect to the tub 30. This adjustment serves to change the torque necessary for the mercury 74 to contact switch 76 and also allows for adjustments that are necessary between different production machines or if different agitation speeds are to be used.

In the usual case, small increments of water will be added to the basket 22 so that the water will reach an optimum level intermediate the minimum and maximum levels determined by the switches 90 and 92.

However, it will be understood that if an extra heavy load is put into the machine, torque will continue to be transmitted from the agitator to the tub and basket and the water will be introduced in successive increments until the maximum level is reached. Thereupon, the maximum water level switch 92 will open, so that the machine may then proceed through its normal cycle.

The sensitivity of the system is, in part, controlled by the time selected between the energization of the time delay relay 100 and the opening of its normally closed contacts 102. If a five second time delay relay is utilized, approximately one-quarter to one-half a gallon of water, for example, will be added for every energization of the water inlet solenoid 88. When it is considered that the maximum water level switch will open at, for example, from 17 to 18 gallons in the machine, it will be seen that the margin of error in determining the optimum water level will be quite small.

Although a circuit whereby the water inlet solenoid 88 is in series with the mercury sensor switch 70 may be utilized within the scope of the invention, the relatively short impulses afforded by the mercury sensor switch might be somewhat less satisfactory than the time delay operation described.

Accordingly, there has been provided an automatic washing machine which can be filled to the appropriate level for a specific load without any manual operations being required, and without the exercise of judgment on the part of the operator. The machine is highly effective in saving hot water and detergents, so that considerable economy of operation is afforded, and the reduction in wear on the machine by the elimination of torque and vibration during the agitation cycle assures an unusually long life for the machine.

Although we have herein set forth and described our invention with respect to certain specific principles and details thereof, it will be understood by those skilled in the art that these may be varied without departing from the spirit and scope of the invention as set forth in the hereunto appended claims.

We claim:

1. The method of filling a clothes washing machine having a liquid-receiving, movably-mounted container and an oscillatable agitator therein with an optimum quantity of washing fluid for varying clothes loads inserted in said container, comprising: adding a minimal quantity of washing fluid to said container, initiating oscillation of said agitator to commence the process of washing the clothes load inserted in said container, sensing the declining torque transmitted from said agitator to said container as washing fluid is added to said container, and terminating the addition of washing fluid to said container when the torque transmitted to said container declines to a predetermined value.

2. The method of filling a clothes washing machine having a liquid-receiving, movably-mounted container and an oscillatable agitator therein with an optimum quantity of washing fluid for varying clothes loads inserted within said container, comprising: initiating the filling of said container by directing a stream of washing fluid into said container, initiating oscillation of said agitator subsequent to the initiation of the filling of said container, monitoring the declining torque transmitted from said agitator to said container through the clothes load and washing fluid carried within said container as said stream continues to fill said container, and terminating the addition of washing fluid to said container when the torque transmitted to said container declines to a predetermined minimum value.

3. The method of filling a clothes washing machine having a liquid-receiving, movably-mounted container and an agitator movable therein with an optimum quantity of washing fluid for varying clothes loads within said container, comprising: adding a minimal quantity of washing fluid to said container, initiating movement of said agitator within said container to commence the washing of the particular clothes load inserted therein, sensing the magnitude of forces transmitted to said container through said clothes load, and terminating the addition of washing fluid to said container when said forces decline to a predetermined minimum value due to the addition of the washing fluid to said container.

References Cited in the file of this patent

UNITED STATES PATENTS

| | | |
|---|---|---|
| 1,847,159 | Adams | Mar. 1, 1932 |
| 2,972,510 | Briss et al. | Feb. 21, 1961 |